Dec. 4, 1934.    R. C. NESBIT    1,983,143
HARROW
Filed May 8, 1934    2 Sheets-Sheet 1

Inventor
Robert C. Nesbit,

By Clarence A. O'Brien,
Attorney

Dec. 4, 1934.   R. C. NESBIT   1,983,143
HARROW
Filed May 8, 1934    2 Sheets-Sheet 2

Inventor
Robert C. Nesbit,
By Clarence A. O'Brien
Attorney

Patented Dec. 4, 1934

1,983,143

UNITED STATES PATENT OFFICE 1,983,143

HARROW

Robert C. Nesbit, Alpharetta, Ga.

Application May 8, 1934, Serial No. 724,589

3 Claims. (Cl. 55—23)

The present invention relates generally to agricultural implements and more particularly to new and useful improvements in harrows and has for one of its important objects to provide, in a manner as hereinafter set forth, a harrow embodying a novel construction, combination and arrangement of parts through the medium of which the teeth may be expeditiously and thoroughly cleaned without the necessity of stopping.

Another important object of the invention is to provide a harrow embodying novel means for mounting and securing the teeth in position on the transverse members.

Still another important object of the invention is to provide a harrow embodying a novel construction and arrangement through the medium of which large or small clods will be effectively crushed and substantially pulverized.

Other objects of the invention are to provide a harrow which will be simple in construction, strong, durable, highly efficient and reliable in use, light in weight, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 4 is a detail view in front elevation of one form of tooth which may be used with the harrow.

Figure 1:
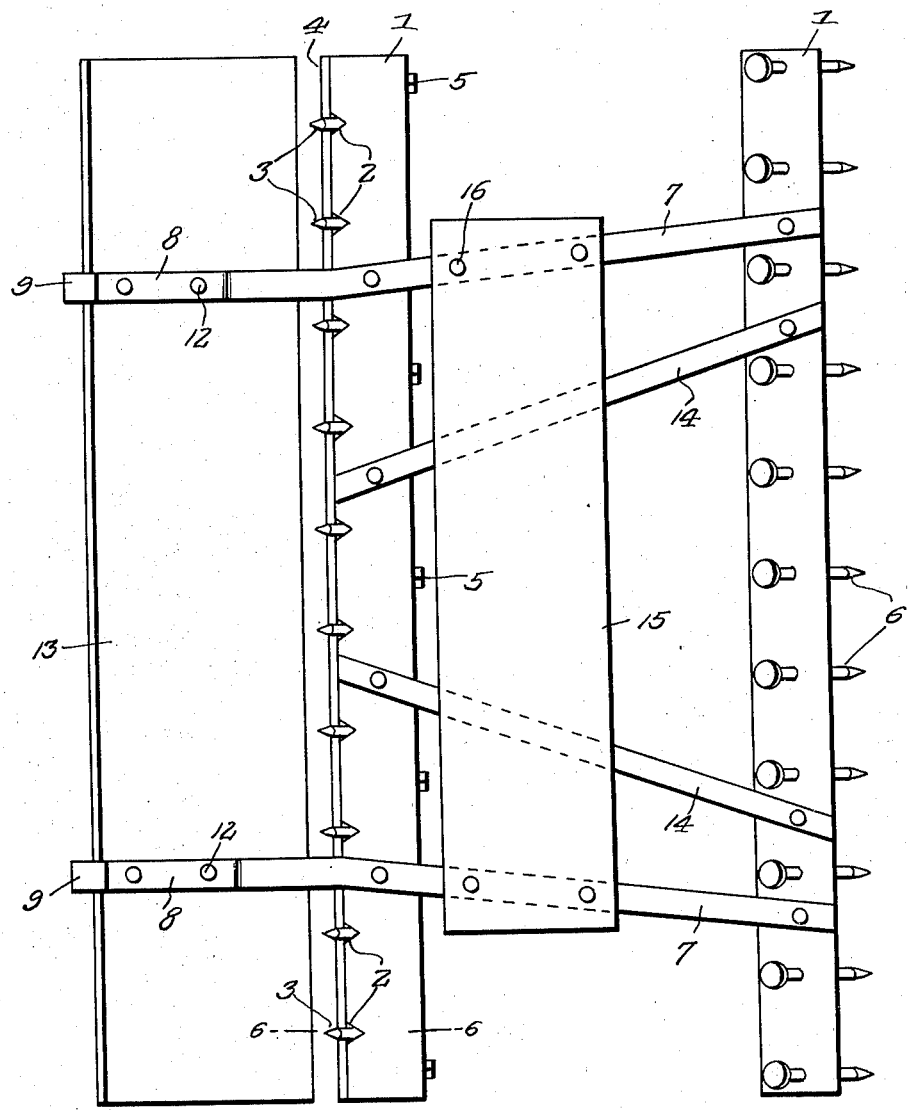
Figure 1 is a view in top plan, showing a harrow constructed in accordance with the present invention.
Figure 6:
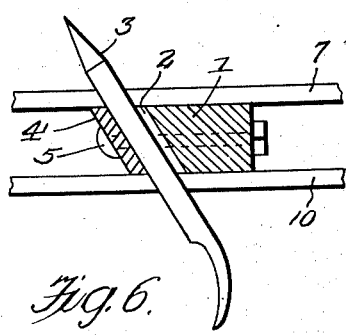
Figure 6 is a vertical sectional view, taken substantially on the line 6—6 of Figure 1.
Figure 5:
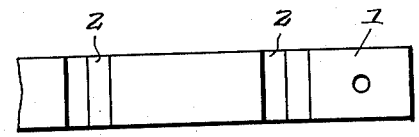
Figure 5 is a view in front elevation showing one end portion of the front beam.

Referring now to the drawings in detail, it will be seen that the embodiment of the invention which has been illustrated comprises a plurality of spaced, parallel, transverse beams 1 of suitable material, preferably wood. As best seen in Figures 1, 5 and 6 of the drawings, the forward edge of the beam 1 is inclined and provided with a series of substantially V-shaped notches 2 for the reception of removable and reversible teeth 3. The teeth 3 are secured in position in the notches 2 through the medium of a metallic strip 4 which is removably secured on the front of the forwardmost beam 2 by nut-equipped bolts 5. It will thus be seen that, by loosening the bolts 5, the teeth 3 may be removed and reversed. It will further be seen that the teeth 3 are secured in an inclined position. The rear beam 1 has mounted thereon a series of inclined, headed teeth 6 which extend through said rear beam.

Figure 2:
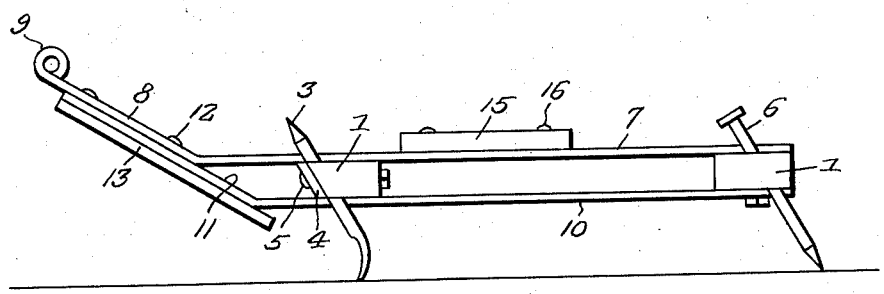
Figure 2 is a view in side elevation thereof.
Figure 3:
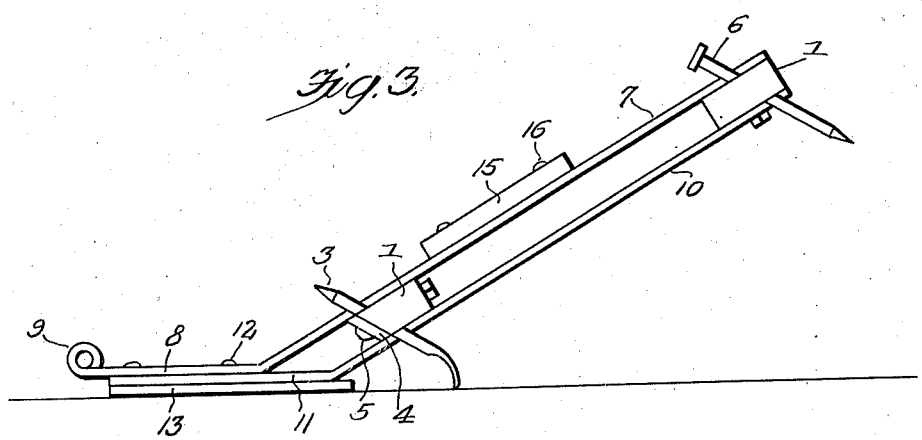
Figure 3 is a view in side elevation, showing the position of the harrow when cleaning or clearing the teeth.

Metallic bars 7 connect the beams 1, said bars including upwardly directed forward portions 8 which project forwardly beyond the forwardmost beam 1 and which terminate in eyes 9 for connecting a hitch to the harrow. Metallic bars 10, below the bars 7, also connect the beams 1, said bars 10 being secured on the lower sides of the beams and terminating in upwardly directed, forwardly projecting end portions 11 which are secured to the portions 8 of the bars 7 by nut equipped bolts 12. As seen in Figures 2 and 3 of the drawings, the bars 10 are shorter than the bars 7 and the angles of said bars 10 are closer to the forwardmost beam 1 than the angles of the bars 7. Secured on the lower side of the upwardly directed portions 11 of the bars 10 is a plank 13 which constitutes an inclined clod crusher when the harrow is functioning in the usual manner and which constitutes a skid when the harrow is tripped for the purpose of cleaning or clearing the teeth, as suggested in Figure 3 of the drawings.

Forwardly converging braces 14 connect the beams 1 between the bars 7. A transversely extending operator's platform 15 rests on the braces 14 and the bars 7, said platform being secured, as at 16, to the bars 7.

In use, the operator, of course, stands on the platform 15 and as the harrow is drawn forwardly, the soil is substantially pulverized by the teeth 2, as will be apparent. It may be well to here call attention to the fact that the teeth on the front and rear beams 1 are staggered. Comparatively large clods which may be encountered are driven downwardly into the plowed ground forwardly of the teeth and crushed by the inclined plank 13, said teeth completing the pulverizing action. Should the teeth become fouled with an excessive quantity of weeds or debris, the operator places one foot on the plank 13 and shifts his weight onto said plank 13, thereby swinging the plank downwardly into engagement with the ground and raising the teeth out of engagement with the ground, as seen in Fig. 3 of the drawings, in which position the rearwardly inclined teeth will clear themselves. It will thus be seen that this operation has been completed without the necessity of stopping.

It is believed that the many advantages of a harrow constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:

1. A harrow comprising a plurality of transverse beams, teeth mounted on the beams, upper and lower bars connecting the beams, said bars including forwardly and upwardly extending forward end portions paralleling each other and secured together, and a plank mounted on said forward end portions of the lower bars.

2. A harrow comprising a plurality of transverse beams, teeth mounted on the beams, upper and lower bars connecting the beams, the upper bars including upwardly angled forward end portions extending forwardly of the forwardmost beam, the lower bars including upwardly angled forward end portions paralleling and abutting the corresponding portions of the upper bars and secured thereto, the angle of the lower bars being rearwardly of the angle of the upper bars, and an inclined plank mounted on the upwardly angled portions of the lower bars.

3. A harrow comprising a plurality of transverse beams, teeth mounted on the beams, upper and lower bars connecting the beams, the upper bars including upwardly angled forward end portions extending forwardly of the forwardmost beam, the lower bars including upwardly angled forward end portions paralleling and abutting the corresponding portions of the upper bars and secured thereto, the angle of the lower bars being rearwardly of the angle of the upper bars, and an inclined plank mounted on the upwardly angled portions of the lower bars, said plank constituting a clod crusher when in one position and being engageable with the ground and constituting a skid when in another position, braces extending between the beams, and a platform mounted on the upper bars and braces between the beams.

ROBERT C. NESBIT.